United States Patent [19]

Sato et al.

[11] Patent Number: 4,743,988
[45] Date of Patent: May 10, 1988

[54] THIN-FILM MAGNETIC HEAD

[75] Inventors: Kazuhiro Sato, Sagamihara; Togo Nishiyama, Yokohama; Katsuhiko Oguri, Fujisawa, all of Japan

[73] Assignee: Victor Company of Japan, Ltd., Japan

[21] Appl. No.: 823,252

[22] Filed: Jan. 28, 1986

[30] Foreign Application Priority Data

Feb. 1, 1985 [JP] Japan .................................. 60-18092
Feb. 5, 1985 [JP] Japan ............................ 60-15216[U]

[51] Int. Cl.⁴ ........................................... G11B 5/147
[52] U.S. Cl. .................................................. 360/126
[58] Field of Search .......................... 360/126; 29/603; 156/667

[56] References Cited

U.S. PATENT DOCUMENTS

| 4,191,983 | 3/1980 | Gibson . | |
|---|---|---|---|
| 4,239,587 | 12/1980 | Koel et al. . | |
| 4,458,279 | 7/1984 | Katz . | |
| 4,516,180 | 5/1985 | Narishige | 360/126 |
| 4,558,385 | 12/1985 | Kaminaka | 360/126 |

FOREIGN PATENT DOCUMENTS

| 2835577 | 3/1979 | Fed. Rep. of Germany . | |
|---|---|---|---|
| 55-84016 | 6/1980 | Japan | 360/126 |
| 57-58216 | 4/1982 | Japan . | |
| 58-32217 | 2/1983 | Japan . | |

Primary Examiner—A. J. Heinz
Attorney, Agent, or Firm—Lowe, Price, LeBlanc, Becker & Shur

[57] ABSTRACT

A thin-film magnetic head is disclosed wherein a first core portion includes an insulative island of inorganic material. A first coil section is formed in the island so that it presents a flat common surface with the island and substrate. A gap-forming insulating layer is on the first coil section and the first core portion. A second core portion is on the gap-forming layer, forming a magnetic circuit with the first core portion. A second coil section is connected to the first coil section to form a coil therewith. In a modification, the head comprises a nonmagnetic substrate in which a coil section is formed to present a flat common surface. Metallic ferromagnetic material is used to form core portions on the coil section.

10 Claims, 4 Drawing Sheets

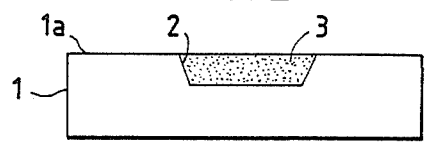
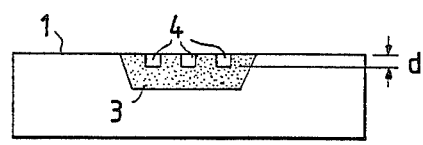
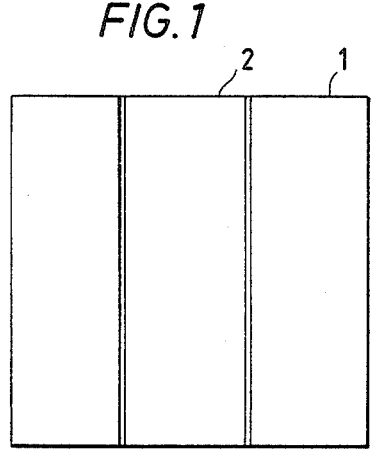
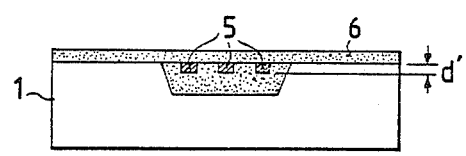
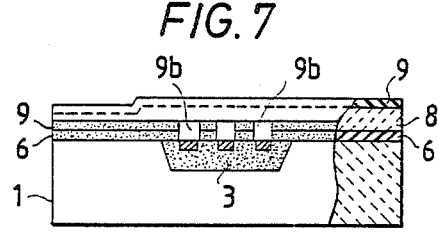
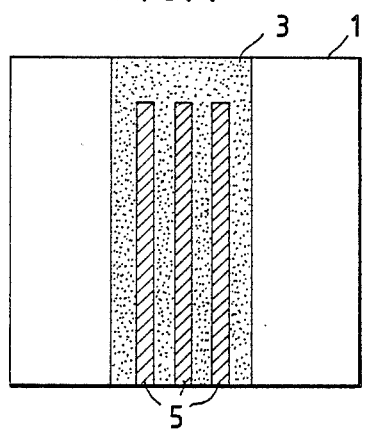
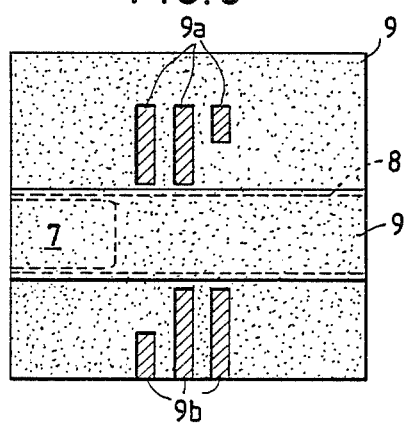
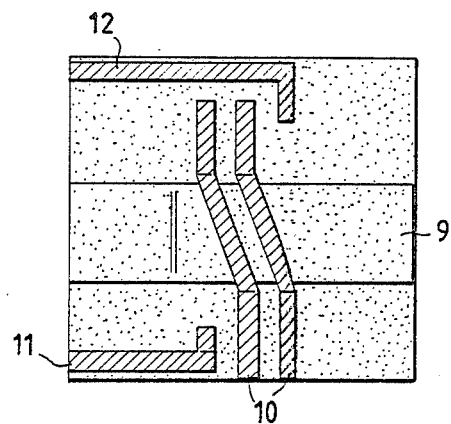

THIN-FILM MAGNETIC HEAD

BACKGROUND OF THE INVENTION

The present invention relates to a thin-film magnetic head and a method for fabricating the same.

According to a current method as described in Japanese Provisional patent specification No. 57-58216, a thin-film magnetic head is fabricated by forming a lower coil section on a flat surface of an insulating substrate and depositing a first, thin layer of resin on the coil section. Permalloy is deposited on the first resin layer, forming a lower core half on which a gap-defining insulating layer is formed. An upper coil section is then formed in a second resin layer which is deposited on the gap-defining layer. Finally, an upper core half is formed on the second resin layer. Because of the small thickness the first resin layer follows the contours of the lower coil section and as a result the overlying lower core half follows an undulating contour of the first resin layer. Since this undulating configuration results in a poor operating characteristic, the prior art method is found to be unsatisfactory.

According to one approach, a lower coil section is formed in a groove of a ferrite substrate by depositing copper or aluminum followed by the deposition of fused glass typically at a temperature in the range between 450° C. and 750° C. on the coil section. The substrate is then lapped to remove an excess amount of the fused glass until it presents a common flat surface. An upper coil section is formed on the glass-filled portion, followed by the successive deposition of a gap-defining layer and a ferrite core layer thereon.

While this approaches eliminates the undulation problem, the high fusion temperature of the filling glass tends to oxidize the underlying conductor. Since the conductor has a different coefficient of thermal expansion than the substrate, the heat produced by the fused glass could lead to a serious damage in the core structure. A further disadvantage is that, since the lower coil section is to be formed on the bottom of a groove, difficulty is encountered in uniformly applying a photoresist layer, and since a photomask must be placed on the surface of the substrate, the light passing through it tends to be defocused on the bottom of the groove, producing a blurred image. This imposes limitations on the number of coil turns which can be fabricated.

SUMMARY OF THE INVENTION

Accordingly, it is an object of the present invention to provide a thin-film magnetic head having improved operating characteristics and a larger number of coil turns than is available with the prior art techniques.

According to one aspect of the invention, a thin-film magnetic head comprises a first core portion having an insulative island of inorganic marerial therein. In the island is formed a first coil secrion which presents a flat common surface with the substrate on which a gap-defining insulating layer is formed. A second core portion is formed on the gap-forming layer to form a magnetic gap with the first core portion. A second coii section is formed either on the second core portion or on the substrate and connected to the first coil section to form a coil therewith.

According to another aspect of the invention, the thin-film magnetic head comprises a substrate of nonmagnetic material in which a first coil section is embedded, presenting a flat common surface with the substrate. First and second core portions of metallic ferromagnetic material are stacked on the common flat surface in electrically nonconductive relation with the first coil section. A second coil section is formed on the second core portion in electrically nonconductive relation therewith to form a coil with the first coil section.

BRIEF DESCRIPTION OF THE DRAWINGS

The present invention will be described in further detail with reference to the accompanying drawings, in which:

FIG. 1 is a plan view of a ferromagnetic substrate with a groove formed thereon used in the initial step of fabrication according to a first embodiment of the present invention;

FIG. 2 is an end view of the substrate of FIG. 1 showing the groove being filled with an inorganic filling material;

FIG. 3 is an end view of the substrate with a plurality of coil-forming grooves formed on the groove-filling material;

FIG. 4 is a plan view of the substrate with the coil-forming grooves being filled with conductive material;

FIG. 5 is an end view of the substrate coated with a magnetic-gap defining layer;

FIG. 6 is a plan view of the substrate showing the next step by which an upper core half and an insulating layer are successively formed on the substrate;

FIG. 7 is an end view of the substrate of FIG. 6, with a portion being cut away to reveal a cross-section;

FIG. 8 is a plan view illustrating an upper coil pattern being formed on the insulated upper core half of FIG. 7;

DETAILED DESCRIPTION

Figure 9:
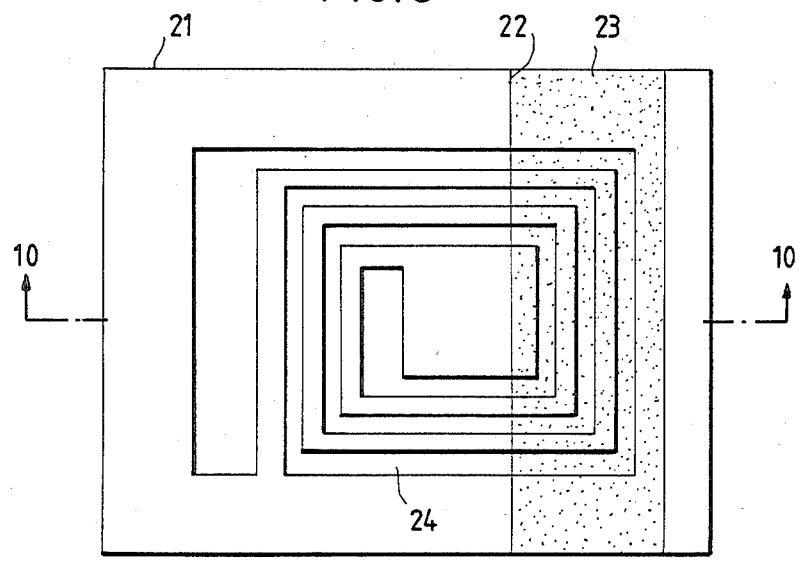
FIG. 9 is a plan view of a ferromagnetic substrate formed with a groove of spiral pattern according to a modification of the previous embodiment.
Figure 10:
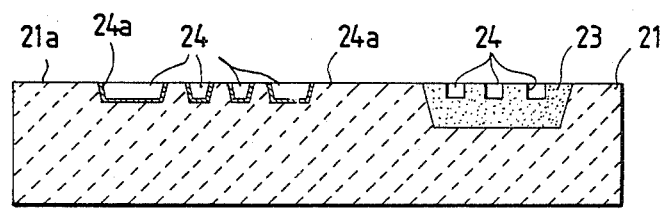
FIGS. 10 and 11 are end views illustrating steps following the step of FIG. 9.
Figure 11:
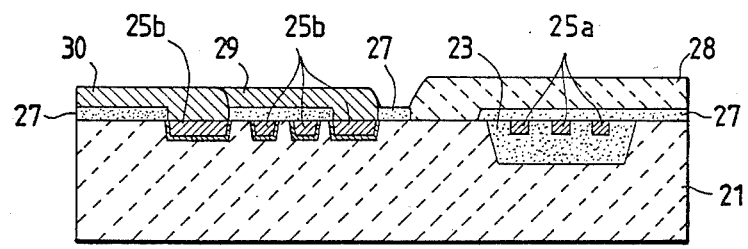

Referring to FIGS. 1 to 8 of the drawings, there is shown a series of steps for fabricating a thin-film magnetic head according to a first embodiment of the present invention. For purposes of disclosure, only one magnetic head is shown. In practice, a plurality of such thin-film magnetic heads are fabricated simultaneously on a single substrate to be cut off into individual heads or fabricated as a multi-head assembly. Illustrated at 1 is a ferromagnetic substrate formed of ferrite or Sendust (the trademark of Tohoku Kinzoku Kabushiki Kaisha). Substrate 1 has on a major surface 1a a groove 2 having downwardly tapered parallel side walls. Groove 2 is formed by any suitable method such as diamond cutting or chemical etching. Groove 2 is filled with an insulative nonmagnetic material such as fused glass, $Al_2O_3$ or SiO₂ to form an island 3. This filling material must be inorganic. Organic materials have proved unsuitable for the present invention. Substrate 1 is lapped uniformly to remove any excess filling material so that it presents a mirror-finish surface. Using a photoeching method, a plurality of parallel grooves 4 having a depth "d" are formed on the insulator 3 as shown in FIGS. 3 and 4. To form a lower half of the coil of the magnetic head, nonmagnetic conductive material 5 such as aluminum or copper is deposited in the grooves 4 using sputtering or evaporation techniques until it attains a thickness greater than d. The surface of substrate 1 is again lapped to a mirror finish by removing the excess material from grooves 4 so that they have a depth d' smaller than d (FIG. 5).

Nonmagnetic insulative material is deposited on the major surface of substrate 1 until it attains a predetermined thickness to form a magnetic-gap defining layer 6. To provide contact between the ferromagnetic substrate 1 and an upper core half, a portion of the layer 6 is removed as indicated by a hatched area 7 (FIG. 6.).

Upper core half 8 is formed on the insulative layer 6 and portion 7 of the substrate by depositing ferromagnetic material such as ferrite or Sendust using a well known technique. Upper core half 8 is in a rectangular shape extending in a direction perpendicular to the length of the lower coil half 5. Insulative material is then deposited on the device to form a layer 9 which covers the upper core half 8 and the portions of insulative layer 6 not occupied by core half 8 (FIGS. 6 and 7). Insulative layers 6 and 9 are etched to expose portions of the lower coil half 5 through rectangular holes 9a and 9b to enable it to be connected to an upper coil half 10. Upper coil half 10 is formed by deposition of the same material as used in forming the lower coil half 5 over areas including throughholes 9a, 9b and insulated upper core half 8, so that lower and upper coil halves 5 and 10 are connected in a zigzag pattern, as shown in FIG. 8. Simultaneously, electrodes 11 and 12 are deposited on the insulative layer 9 for coupling the ends of the coil to external circuitry.

Since the lower coil half 5 is made flush with the major surface 1a of the ferromagnetic substrate 1 which acts as the lower core half, the magnetic circuit formed by upper core half 8 has no undulations as encountered with prior art magnetic heads. Furthermore, the formation of a lower coil half 5 in the island 3 eliminates the prior art problem associated with the difference in thermal expansion coefficient between these dissimilar materials.

An alternative form of the present invention is illustrated in FIGS. 9 to 12. A ferromagnetic substrate 21 of ferrite or Sendust has a groove 22 which is filled with an inorganic insulative material 23 in a manner similar to the previous embodiment. On the major surface 21a of substrate 1 is formed a groove 24 of spiral pattern with portions of the groove 24 being formed on the island 23 and the remainder being on the substrate 21. Inorganic insulating nonmagnetic material is then selectively deposited in the groove 24 that is formed on the substrate 21 to form a thin layer as indicated by a thick line 24a that covers the bottom and side walls of the groove 24 for insulation from substrate 21 as it is electrically isolated by island 23 from substrate 21.

Figure 12:
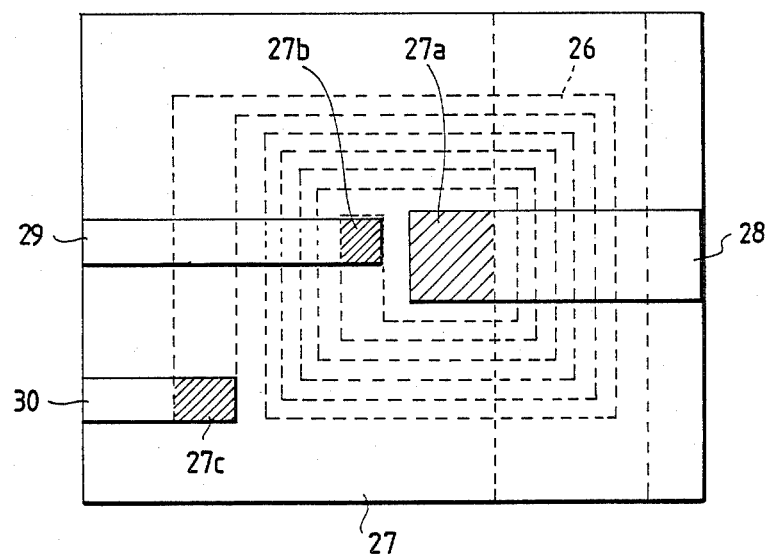
FIG. 12 is a plan view illustrating an upper core half being formed on the spiral coil pattern with two electrodes formed on the insulated surface of the substrate of FIG. 9.

Aluminum or copper is deposited on the insulated groove 24 to form a spiral coil 25 having a first coil portion 25a on the island 23 and a second coil portion 25b on the substrate 21. Excess conductive material is removed by lapping the surface of the substrate 21 to present a flat surface. A magnetic-gap defining insulating layer 27 is deposited on the entire area of the major surface 21a. As illustrated in FIG. 12, hatched portions 27a, 27b and 27c of the insulating layer 27 are etched away to expose a portion of the substrate 21 and the terminal portions of the conductor 25. An upper core half 28 is deposited on that portion of the insulative layer 27 that extends from the right-hand edge of the substrate 21 to the exposed portion 27a of layer 27. Conductive material is deposited on areas extending from the exposed terminal portions of conductor 25 to the left-hand edge of substrate 21, forming electrodes 29 and 30.

Figure 13:
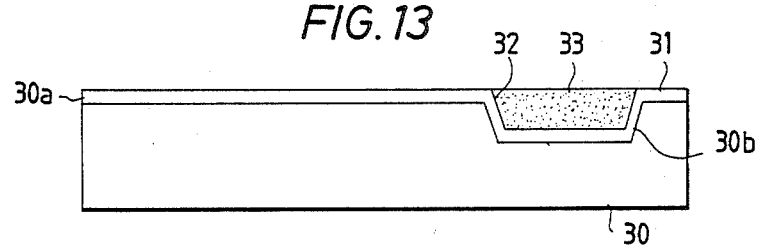
FIGS. 13–14 are illustrations of modified forms of the embodiment of FIGS. 9–12.

In a modified form of the invention, FIG. 13, a nonmagnetic substrate 30 has a groove 30b on the major surface 30a thereof. Suitable materials for the substrate 30 include ceramics. A conductive ferromagnetic material such as Sendust is sputtered on the major surface 30a, forming a layer 31 of uniform thickness and a groove 32. Inorganic substance is deposited in groove 32 to form an elongated island 33. The above process is followed by steps similar to those described in the previous embodidments. Ceramic substrate 30 ensures wear resistive contact with recording mediums while the conductive ferromagnetic layer 31 ensures high flux density. Alternatively, in FIG. 14, a substrate 41 of nonmetallic, or oxide ferromagnetic material such as ferrite has a metallic ferromagnetic portion 41a on the tape contact edge and an island 43 in groove 42 adjacent the conductive ferromagnetic portion 41a. Metallic ferromagnetic edge portion 41a has the effect of concentrating flux in the tape contact portion.

Figure 14:
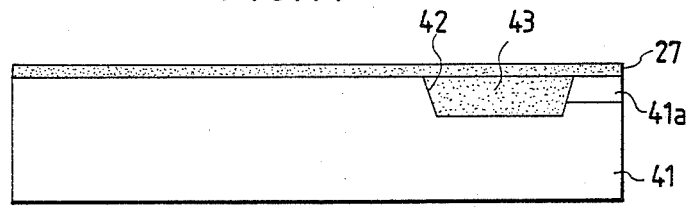
Figure 15:
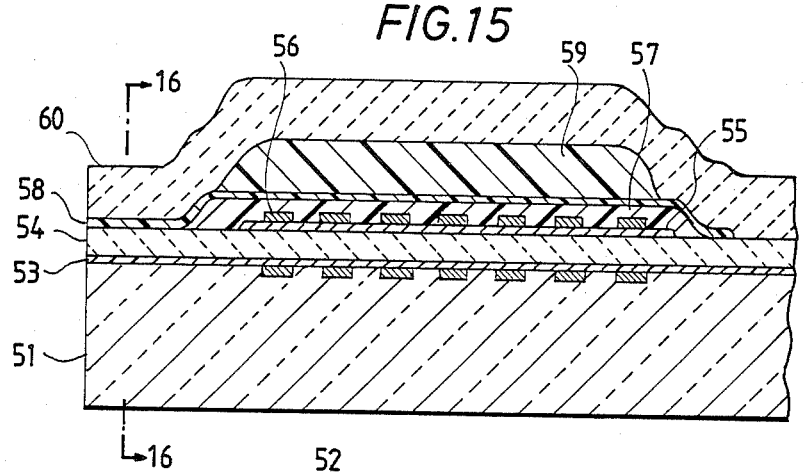
FIG. 15 is a cross-sectional view of a thin-film magnetic head according to a second embodiment of the present invention.
Figure 16:
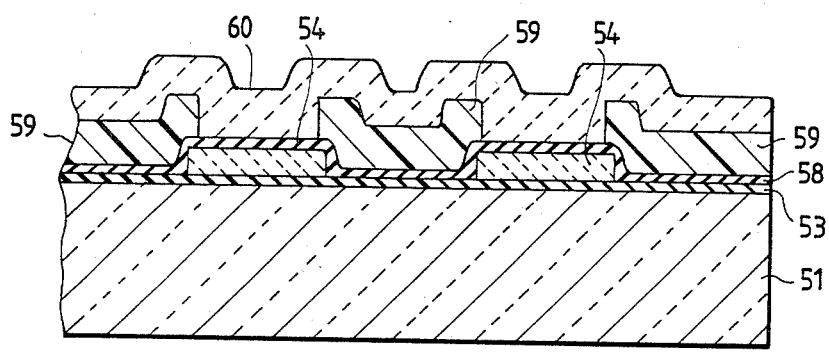
FIG. 16 is a cross-sectional view taken along the lines 16—16 of FIG. 15.

FIGS. 15 and 16 are illustrations of a modified form of the embodiments of FIGS. 13 and 14. Illustrated at 51 is a nonmagnetic substrate formed of a wear resistive material such as ceramic (Al₂O₃-TiN) or sapphire (Al₂O₃). A lower coil half 52 is embedded on the substrate 51. This is accomplished by depositing copper or molybdenum in the form of parallel strips and sputtering the same material as the substrate 51 over the entire surface of the substrate until it attains a thickness greater than the thickness of the deposited half coil. After the deposition, the device is lapped until the coil is revealed.

The magnetic head includes an insulating layer 53 on the lower coil half 52 and a metallic ferromagnetic layer 54, or lower core half deposited on layer 53. In the illustrated embodiment, the device is shown as a multihead assembly. Thus, a plurality of lower core halves can be formed simultaneously on a single substrate as seen from FIG. 16. An upper coil half 56 is formed on an insulative layer 55 which is on the lower core half 54. Upper coil half 56 is enclosed in an insulative layer 57. Throughholes (not shown) are formed between corresponding strips of the lower and upper coil halves to complete a coil. A magnetic-gap forming layer 58 is deposited on the area including the left edge portion of the lower core half 54 and the insulative layer 57. On the upper area of gap-forming layer 58 which is directly above the upper coil half 56 is formed a relatively thick layer 59 of insulative material. An upper core half 60 formed of the same material as lower core half 54 is provided covering the left edge portion of gap-forming layer 58, the insulative layer 59 and an exposed portion of the lower core half 54. Suitable materials for the core halves 54 and 60 are Sendust or permalloy. Since the metallic ferromagnetic materials have higher permeability than nonmetallic ferromagnetic materials, the use of such metallic core materials results in a high power thin-film magnetic head. The purpose of relatively thick insulative layer 59 is to increase the spacing between the portions of upper and lower core halves which sandwich the core halves in order to minimize magnetic flux leakage.

Figure 17:
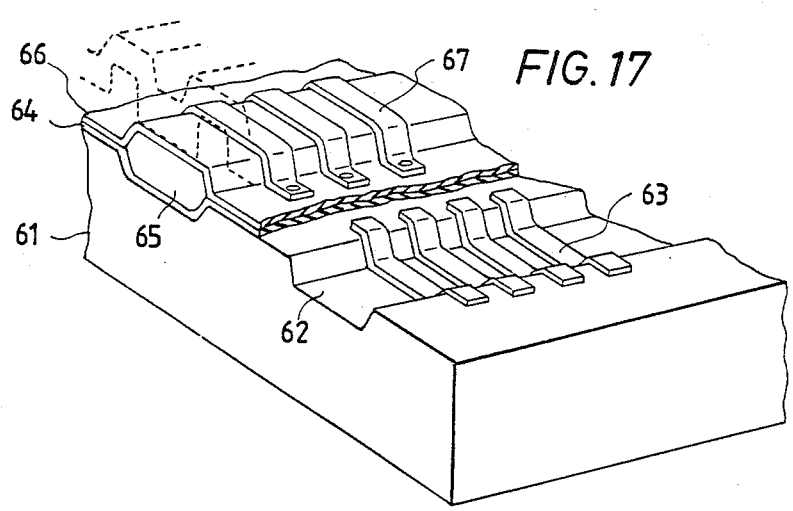
FIG. 17 is a perspective view of a modification of the embodiment of FIG. 15.

A modified form of the embodiment of FIGS. 15–16 is shown in FIG. 17. In this modification, a nonmagnetic substrate 61 has elongated grooves 62 with lower coil halves 63 deposited on the grooves 62 so that the individual strips of each of the core halves 63 lie in parallel across the opposite edges of the groove 62. An insulative layer 64 is deposited on the substrate 61 and conductors 63 to permit conductive ferromagnetic material to be deposited on the insulated grooves 62 to form lower core halves 65, on which an insulative layer 66 is provided to permit upper coil halves 67 to be formed thereon. Processes similar to those described previously will follow to complete a multihead assembly.

What is claimed is:

1. A thin-film magnetic head comprising:
    a first core portion having an insulative island of inorganic material embedded in a base substrate upon which subsequent layers are deposited;
    a first coil section embedded in said island, the first coil section and the island forming a flat common surface with said substrate;
    a gap-forming insulating layer on said flat common surface;
    a second core portion on said gap-forming layer, said second core portion being in magnetically conductive relation with said first core portion; and
    a second coil section connected to said first coil section to form a coil therewith.

2. A thin-film magnetic head as claimed in claim 1, wherein said first core portion comprises a layer of a wear resistive material formed on an insulating nonmagnetic substrate.

3. A thin-film magnetic head as claimed in claim 2, wherein said layer of a wear resistive material is formed of a metallic ferromagnetic material and said substrate is formed of ceramic or sapphire.

4. A thin-film magnetic head as claimed in claim 1, wherein said said first core portion comprises a substrate of nonmetallic ferromagnetic material, said substrate having a portion of metallic ferromagnetic material contacting said gap-forming layer.

5. A thin-film magnetic head as claimed in claim 4, wherein said nonmetallic ferromagnetic material is ferrite.

6. A thin-film magnetic head as claimed in claim 1, wherein said second coil section is mounted on said second core portion so that said coil surrounds the second core portion.

7. A thin-film magnetic head as claimed in claim 1, wherein said second coil section is disposed in said substrate so that said coil is in a spiral shape.

8. A thin-film magnetic head comprising:
    a base substrate of nonmagnetic material upon which subsequent layers are deposited;
    a first coil section embedded in said substrate, the first coil section forming a common flat surface with said substrate;
    a first core portion of metallic ferromagnetic material (54) on said flat surface in electrically nonconductive relation with said first coil section;
    a second coil section in electrically nonconductive relation with said first core portion and in electrically conductive relation with said first coil section to form a coil therewith;
    a gap-defining insulating layer on said first core portion; and
    a second core portion of metallic ferromagnetic material on said gap-defining layer in magnetically conductive relation with said first core portion to form a core therewith.

9. A thin-film magnetic head as claimed in claim 8, wherein said substrate is formed of ceramic or sapphire.

10. A thin-film magnetic head as claimed in claim 8, wherein said second core portion has a portion overlying said second coil section spaced from said first core portion by an insulative layer.

* * * * *